(12) United States Patent
Müller (10) Patent No.: US 7,380,642 B2
(45) Date of Patent: Jun. 3, 2008

(54) PARKING BRAKE FOR A WHEELCHAIR (75) Inventor: Alexander Müller, Sinsheim Weiler (DE)

(73) Assignee: Otto Bock Healthcare IP GmbH & Co. KG, Duderstadt (DE)

( * ) Notice: Subject to any disclaimer, the term of this patent is extended or adjusted under 35 U.S.C. 154(b) by 0 days.

(21) Appl. No.: 11/538,095

(22) Filed: Oct. 3, 2006

(65) Prior Publication Data
US 2007/0119662 A1 May 31, 2007

(30) Foreign Application Priority Data
Oct. 7, 2005 (DE) .................. 10 2005 048 671

(51) Int. Cl.
*B62B 5/04* (2006.01)

(52) U.S. Cl. ..................................... 188/2 F

(58) Field of Classification Search ............ 188/24.22, 188/24.11, 24.14, 1.12, 2 F; 267/160; 280/304.1
See application file for complete search history.

(56) References Cited

U.S. PATENT DOCUMENTS

| 4,570,756 A | * | 2/1986 | Minnebraker et al. ...... 188/2 F |
| 4,601,413 A | * | 7/1986 | Krawagna ................... 222/498 |
| 4,629,232 A | * | 12/1986 | Zimlich et al. ............. 293/128 |
| 4,887,830 A | * | 12/1989 | Fought et al. ............ 280/304.1 |
| 5,022,692 A | * | 6/1991 | Horansky et al. ........... 293/128 |
| 5,152,377 A | * | 10/1992 | Yoshigai ................... 188/24.11 |
| 5,346,039 A | * | 9/1994 | Pfisterer ..................... 188/2 F |
| 5,355,977 A | * | 10/1994 | Kuschall ..................... 188/2 F |
| 5,472,066 A | * | 12/1995 | Schillo et al. .............. 188/2 F |
| 6,520,526 B2 | * | 2/2003 | Amirola .................. 280/304.1 |
| 6,910,557 B2 | * | 6/2005 | Doornbos et al. .......... 188/290 |
| 6,929,100 B2 | * | 8/2005 | Tanksley et al. ............ 188/2 F |

FOREIGN PATENT DOCUMENTS

DE 9405091 5/1994
DE 9309593 11/1994

* cited by examiner

*Primary Examiner*—Robert A. Siconolfi
*Assistant Examiner*—James K Hsiao
(74) *Attorney, Agent, or Firm*—Faegre & Benson, LLP (57) ABSTRACT

Parking brake, in particular for a wheelchair, with a pressing element (10) articulated by a pivoting lever (8) coupled to a retainer (12) mounted to the wheelchair frame. The pivoting lever (8) is tiltable by swiveling a hand brake lever (7) into an engaged position, in which the pressing element (10) exerts force against a wheel (2). In addition, a resetting-force-applying element is set under a pre-load against the pivoting lever (8) to return the pivoting lever (8) to a neutral position when the hand brake is released, characterized by the fact that the resetting-force-applying element is a flexible bendable element (6) formed from a frame cover (5) fastened to the retainer (12).

16 Claims, 10 Drawing Sheets

PARKING BRAKE FOR A WHEELCHAIR

This U.S. patent application claims priority to German patent application no. DE 10 2005 048 671.1, filed on Oct. 7, 2005, published on Aug. 3, 2006 and entitled "FESTSTELLBREMSE, INSBESONDERE FÜR EINEN ROLLSTUHL" (Parking Brakes, in particular for a Wheelchair), which is expressly incorporated by reference herein.

TECHNICAL FIELD

The invention concerns a parking brake, in particular for a wheelchair, with an articulated element that is tiltable by swiveling a hand brake handle into a determined position, in which the articulated element exerts force against a tire of the wheelchair.

BACKGROUND

Sports wheelchairs, which are normally used in sports for handicapped people, differ from everyday life wheelchairs by the fact that they possess a rigid frame construction and have no parking brake, since this can represent a danger of injury for teammates and competitors in competitive sports. However, there is often a desire to use sports wheelchairs in everyday life due to their stability. This desire can be satisfied by attaching a common lever parking brake which can be swung inwards with a handle while practicing the sport, thus eliminating the risk of injury, or also by simply having the option of detaching the parking brake from the wheelchair.

In these types of common parking brakes, the force applying elements are springs or rubber bands, which can be tensed by swiveling the lever and which can rotate the pivoted lever by loosening the brake in its neutral position. The fastening and loading of these springs or rubber bands is relatively complex, since the construction of the brake itself is complicated.

This type of parking brake is exemplified in DE 93 09 593 U1 and corresponding U.S. Pat. No. 5,346,039, or DE 94 05 091 U1 and corresponding U.S. Pat. No. 5,472,066.

SUMMARY

A parking brake for a wheelchair includes a retainer attachable to a frame member of the wheelchair; a lever pivotally attached to the retainer, the lever moving the parking brake between a disengaged and an engaged position when the lever is pivoted; and a pressing element coupled to the lever, the pressing element exerting a force against a wheel of the wheelchair when the parking brake is engaged. The brake also includes a flexible force applying element. The force applying element is coupled to the retainer and is positioned with respect to the lever, so that the force applying element flexes and applies a force to the lever when the lever is moved into the engaged position, the force acting on the lever to return the brake to the disengaged position.

The solution to the problem is based on a parking brake of the kind described above. In the brake of this invention, the resetting force applying element is made out of an elastic bendable part of a frame cover which can be attached to the retainer. The structure of the brake is simplified with this arrangement, since fewer constructive elements are needed, the assembly time and required storage space are reduced, and it can also be economically produced. The frame cover also covers the levers of the parking brake, eliminating any clamping hazard for the hands and/or fingers of the wheelchair user.

The flexible bendable part of the frame cover should preferably rest against the pivoted lever. When the pivoting lever is swiveled in such a way that the pressing element is shifted towards the tire, the bendable part is raised and bent out from its original position, thereby exerting a force against the lever.

If the frame cover is made out of plastic, the bendable part can be simply molded with the cover. Alternatively, the bendable part may be formed by machining of the cover or may be attached to the cover.

Preferably, the frame cover should be fastened to the retainer by means of screws or other suitable fasteners, which form the axis of rotation of the hand brake handle and of the pivoting lever. Thus, reducing the number of components and simplifying the structure of the parking brake even more.

In order to be able to fasten the parking brake to the wheelchair in a simple way, the retainer is preferably fixed in a clip attachable at a crossbar of the frame. The clip clamps onto the frame crossbar and also onto the retainer.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

With the help of the following drawings, an example of a parking brake designed according to the present invention is described below in more detail.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Referring to FIG. 1-FIG. 4, the chair includes a frame 1 having different tubes, on which two rear wheels 2 and two guidable front wheels 3 are arranged. A parking brake 4 is attached to crossbar 1a.

The parking brake 4 includes a retainer 12, to which a tiltable hand brake lever 7, including a hand brake handle 11, is fastened by screw 16, and to which a pivoting lever 8 is tiltably fastened by screw 15. Pivoting lever 8 is connected to pressing element 10 by fastener 20 and washer 21. In addition, a coupling lever 9 connects hand brake lever 7 and pivoting lever 8 to each other to provide an articulated joint. Thus, it can be seen that the wheelchair user may clamp the pressing element 10 against a wheel 2 when activating the parking brake 4. For visual reasons, a frame cover 5 is provided for partially covering levers 7, 8, and 9, and is also fastened to retainer 12 at the rotation axes of levers 7 and 8 by the screws 15 and 16, which are retained by washers 18 and nuts 22.

Figure 1:
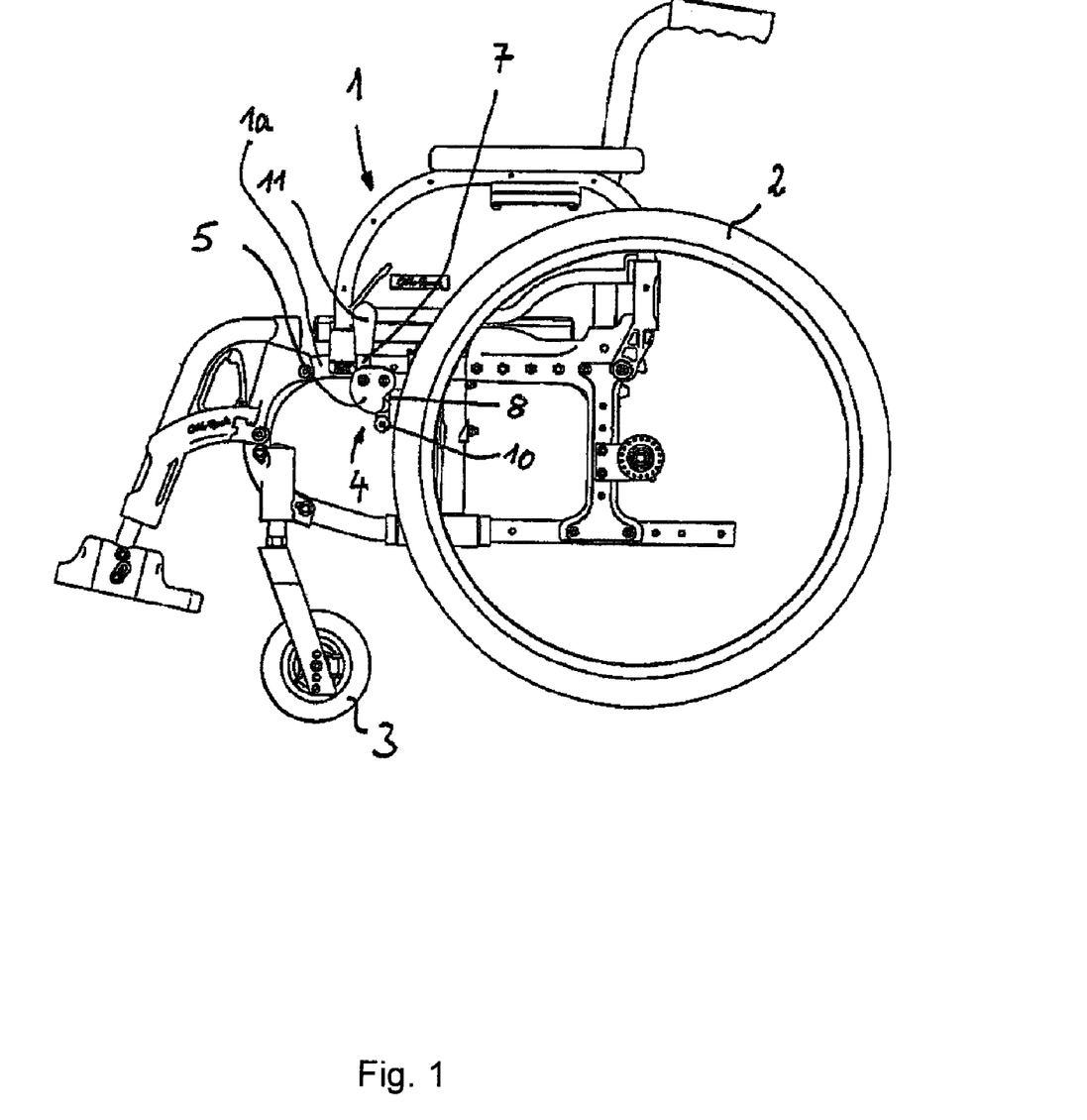
FIG. 1 Lateral view of a wheelchair with the parking brake released.
Figure 2:
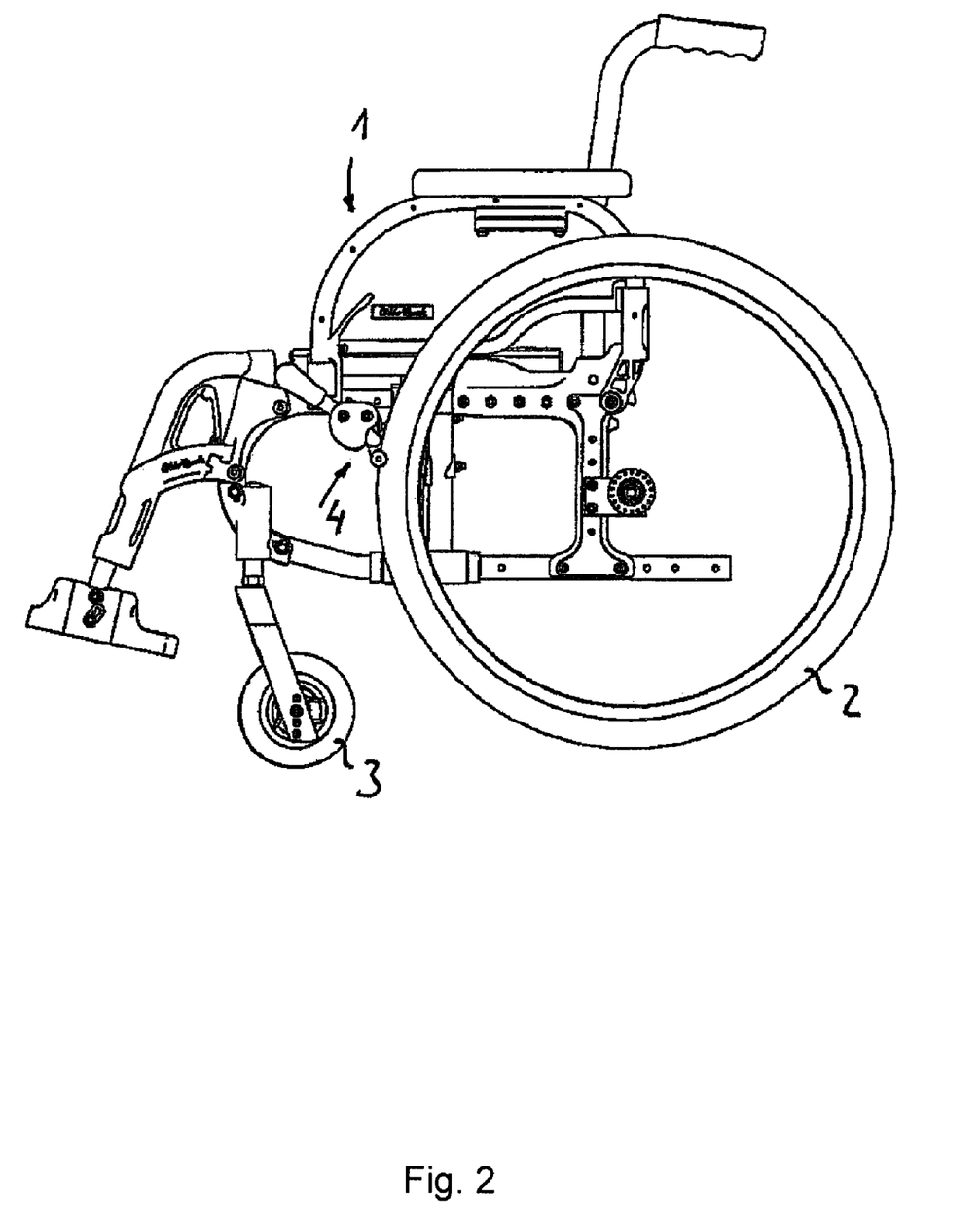
FIG. 2 The wheelchair from FIG. 1, with the parking brake engaged.
Figure 3:
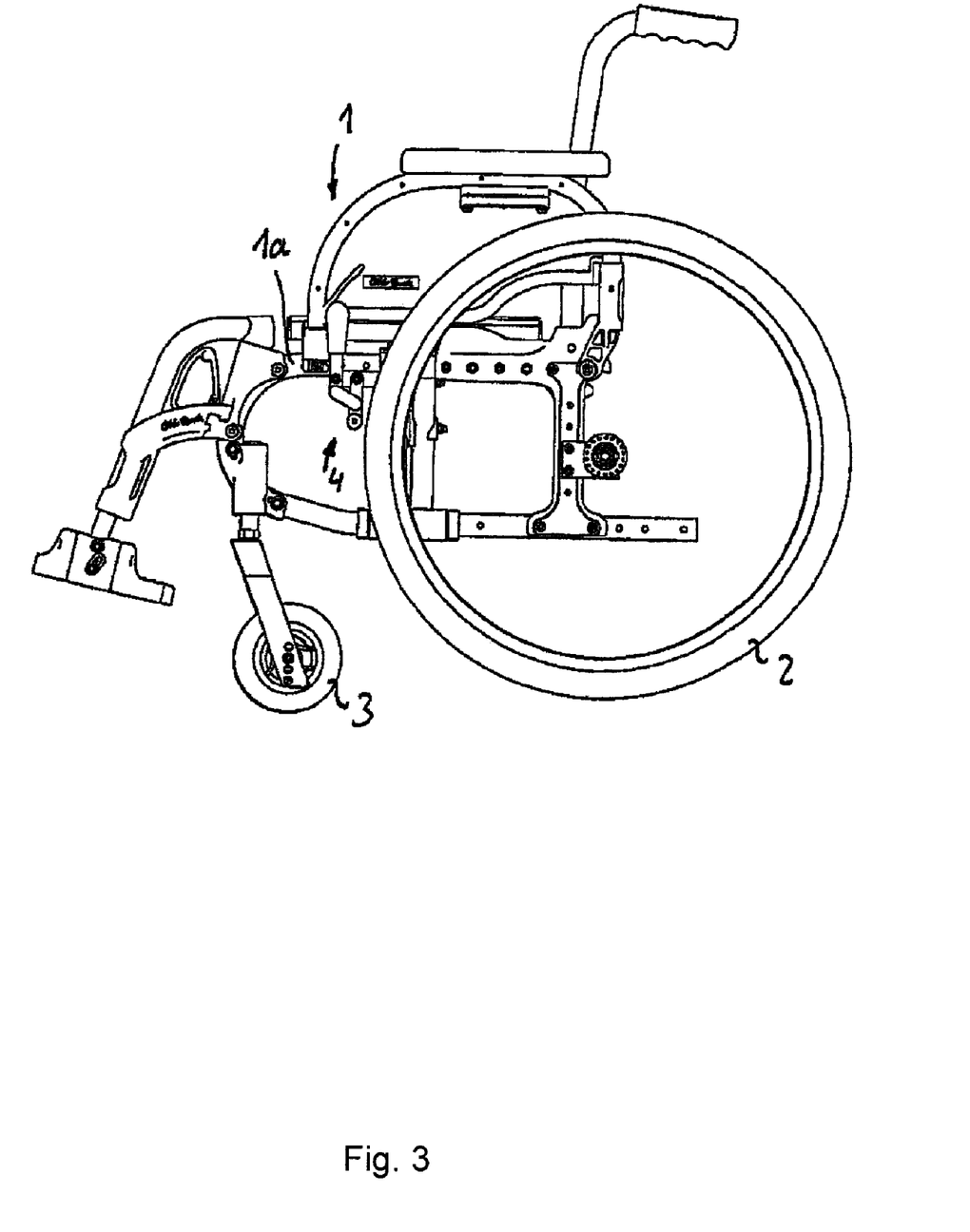
FIG. 3 The wheelchair from FIG. 1 without frame cover.
Figure 4:
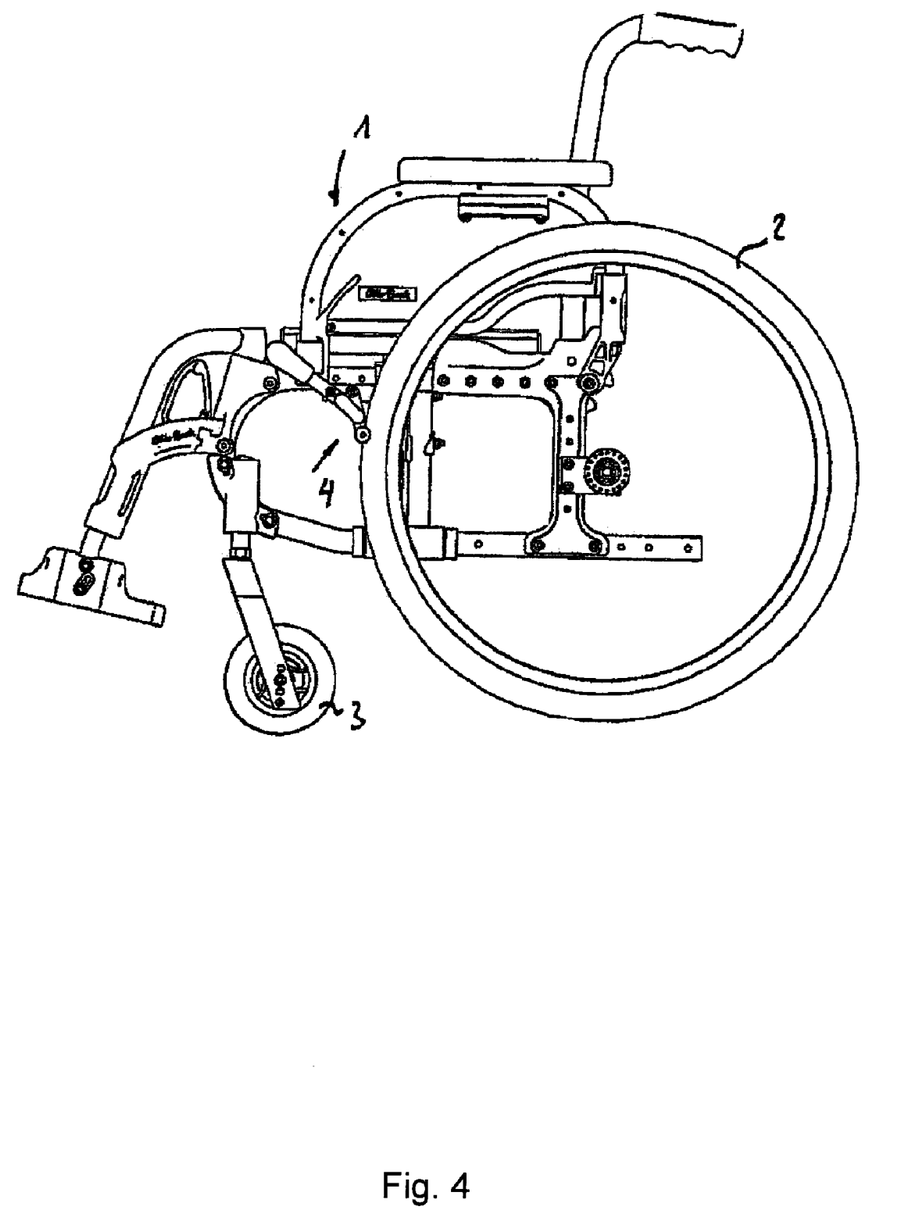
FIG. 4 The wheelchair from FIG. 2 without frame cover.
Figure 5:
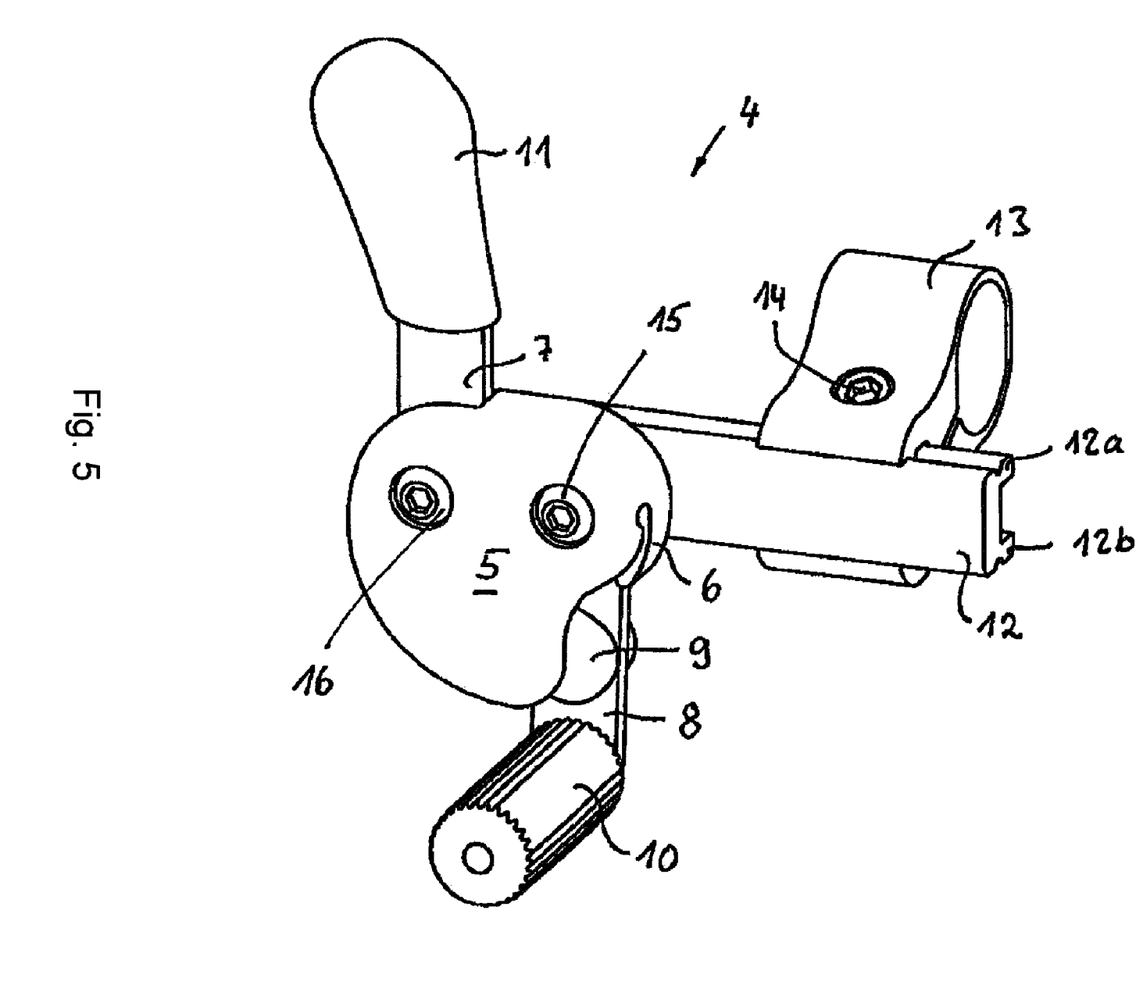
FIG. 5 A perspective view of the parking brake in its released position.
Figure 6:
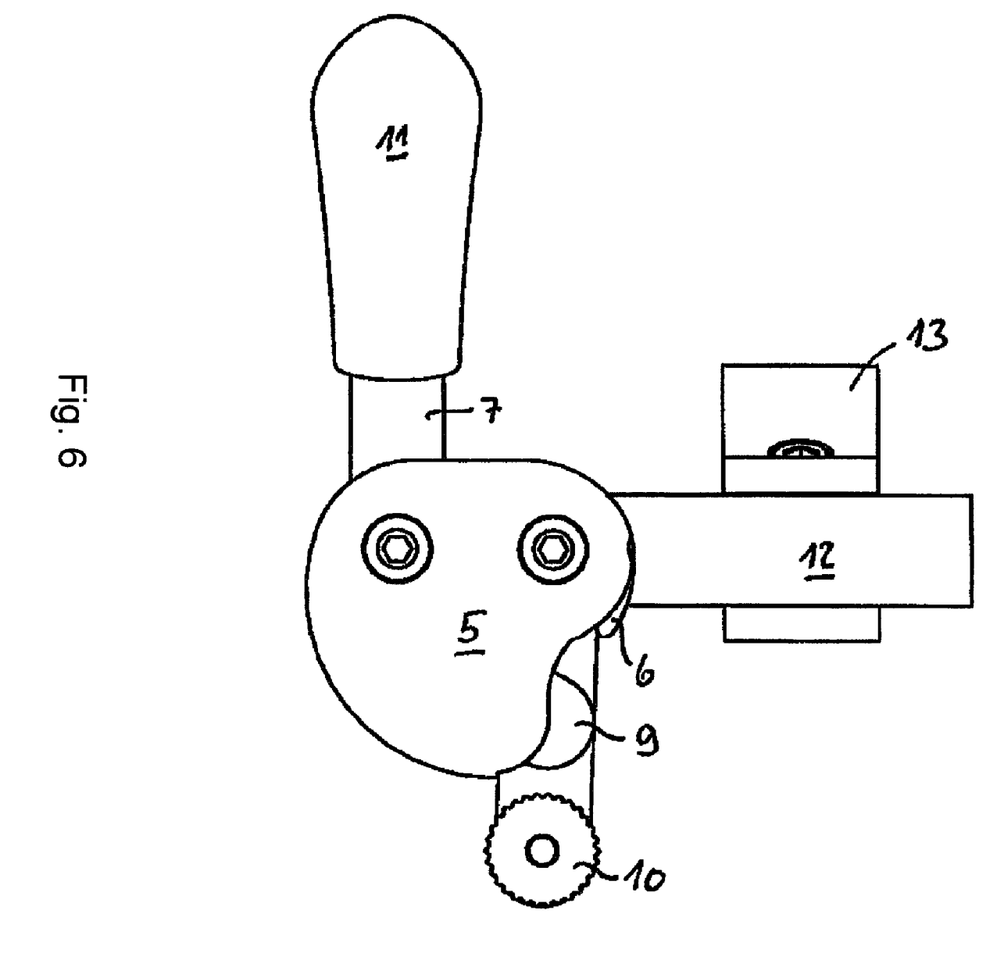
FIG. 6 Top view of the parking brake from FIG. 5.
Figure 7:
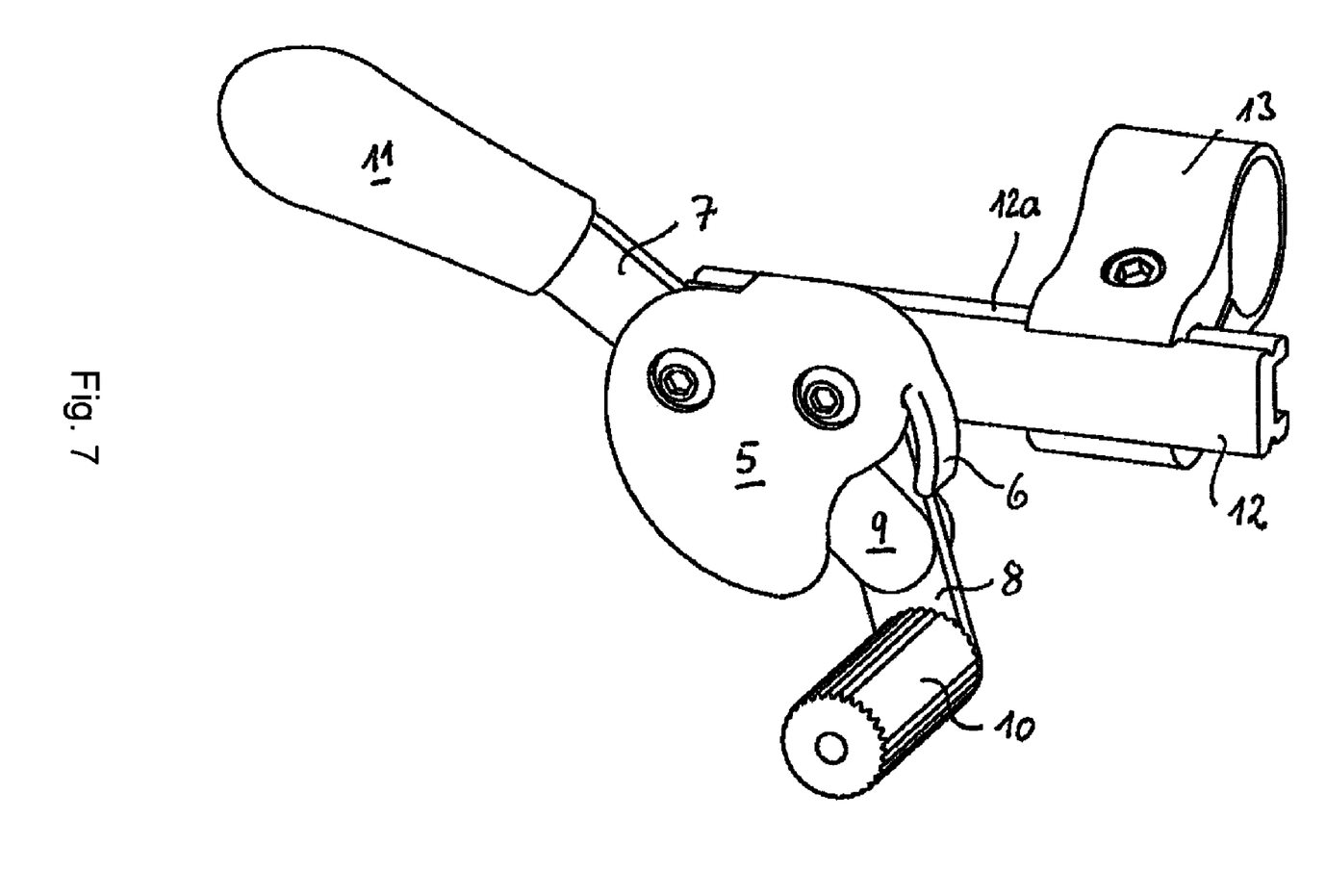
FIG. 7 The parking brake from FIG. 5 in its secure position.
Figure 8:
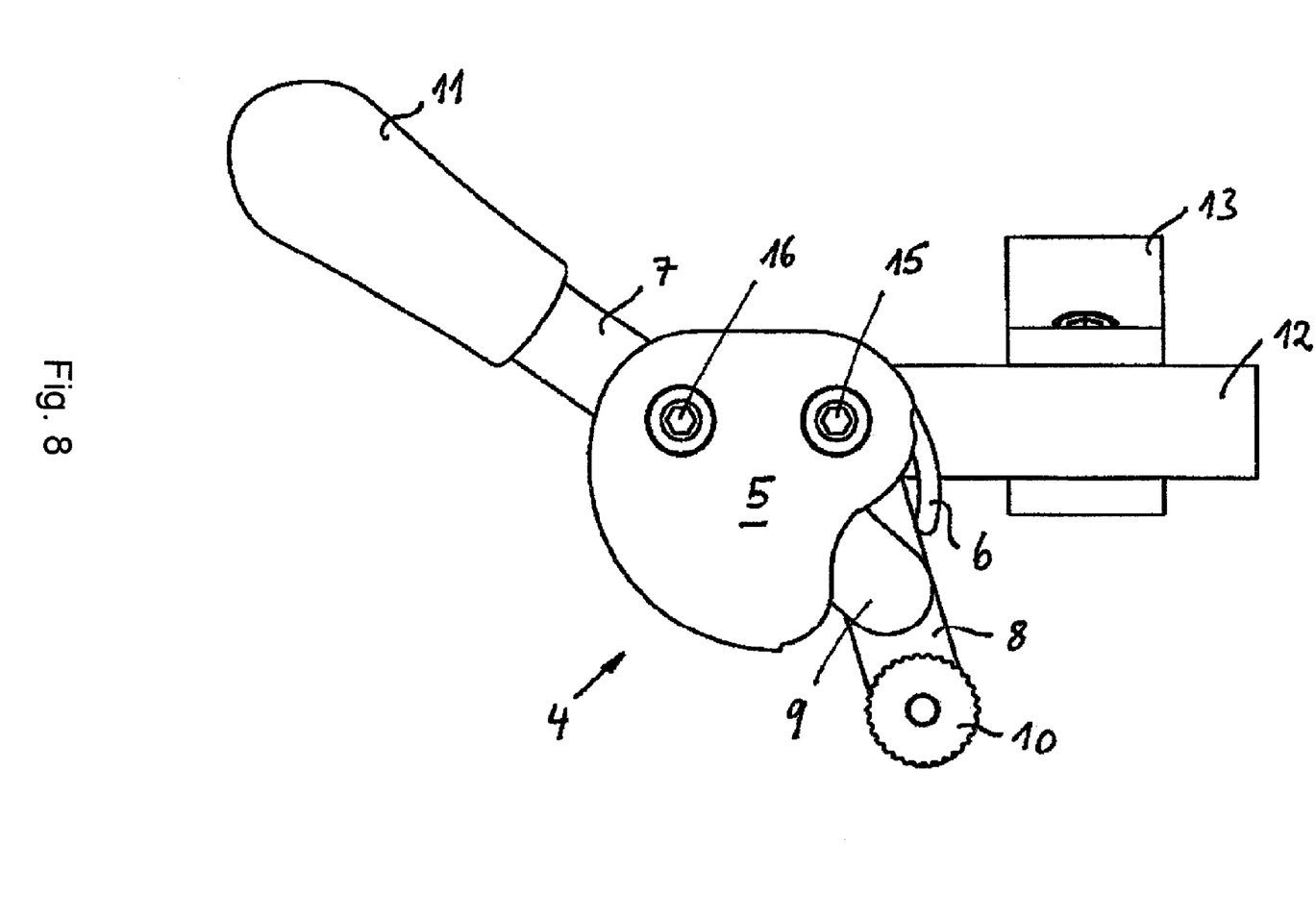
FIG. 8 Top view of the parking brake form FIG. 7.
Figure 9:
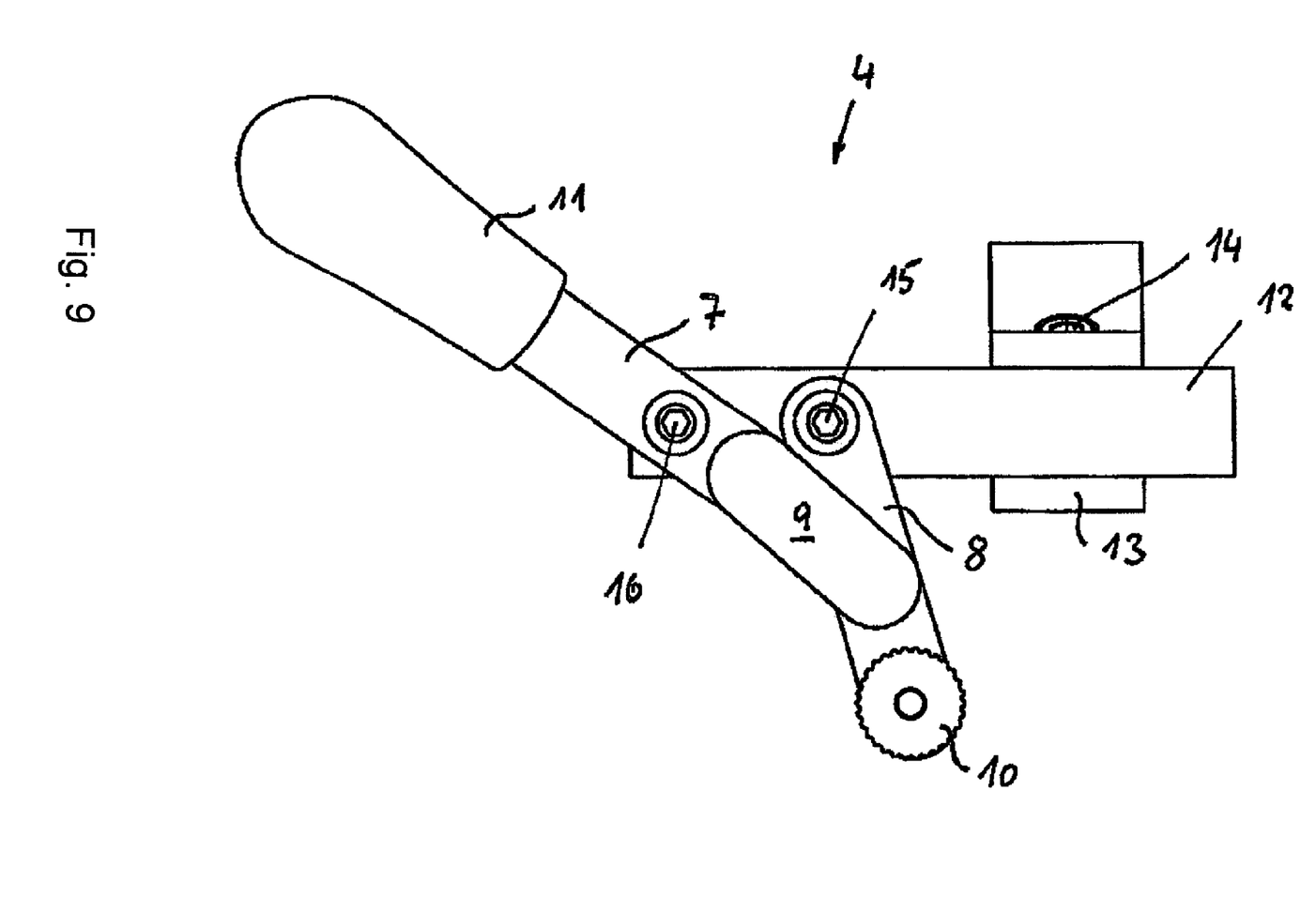
FIG. 9 The parking brake from FIG. 6 without frame cover.

A flexible bendable part 6 is molded on the provided plastic frame cover 5 in an area which is farthest from handle 11 of hand brake lever 7 and which lies close to the pivoting lever 8 (see FIG. 6 and FIG. 8). When the hand brake lever 7 is swiveled from its neutral position, represented in FIG. 6, to its engaged position, as represented in FIG. 8, the pivoting lever 8 presses part 6 outwards. As a result, part 6 becomes bent flexibly and exerts a resetting force against pivoting lever 8. The resetting force tilts the pivoting lever 8 and the hand brake lever 7 back into the neutral position when the parking brake 4 is released.

Figure 10:
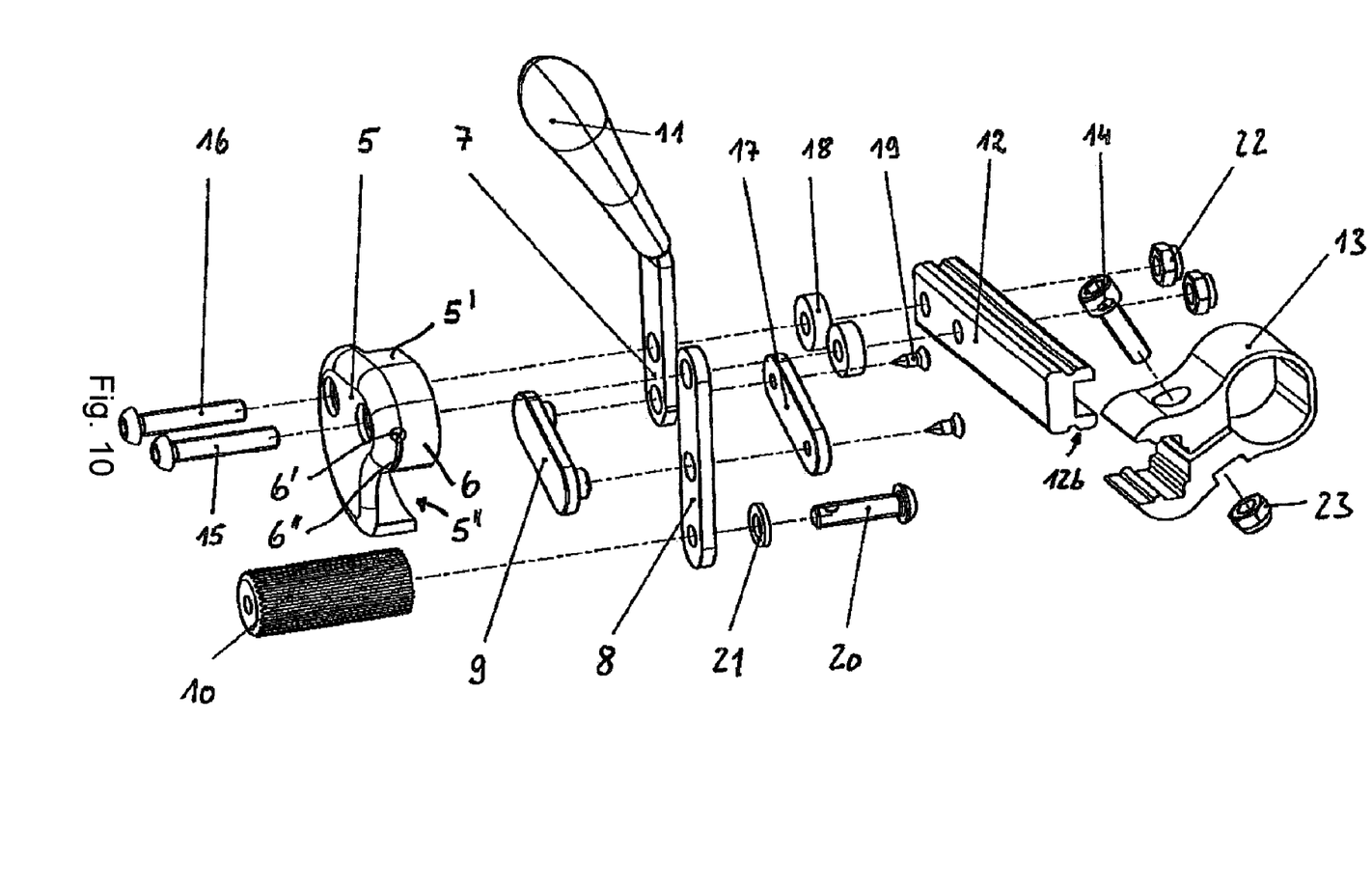
FIG. 10 Exploded representation of the parking brake.

FIG. 10 shows the configuration of the parking brake 4. Frame cover 5 is provided with an axially out-standing flange 5', which has a recess 5" for the pivoting lever 8 and the coupling lever 9. The flexible bendable part 6 is shaped from an end area of flange 5' towards recess 5". The elasticity is achieved by a tension-peak-preventing borehole 6' and the slot 6".

The coupling lever 9 is provided with two external protrusions that are passed through openings in hand brake lever 7 and the pivoting lever 8. The coupling lever 9 is then bolted by fasteners 19 to a plate 17 that serves as a back support.

The retainer 12 is attached at a pair of dove tail shaped guides 12a & 12b to clip 13, which can be attached to the crossbar 1a. The dove tail shaped guides 12a and 12b of retainer 12 are constructed to be properly seated within the two legs of clip 13. Clamp 13 is tightened with screw 14 and nut 23. Thus, clamping takes place at both the crossbar 1a and the retainer 12. Retainer 12 can be adjusted within a certain range in clip 13, in such a way that the parking brake 4 can be adapted to different types of wheelchairs.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

I claim:

1. A parking brake for a wheelchair comprising:
   a retainer attachable to a frame member of the wheelchair;
   a lever pivotally attached to the retainer, the lever moving the parking brake between a disengaged and an engaged position when the lever is pivoted;
   a pressing element coupled to the lever, the pressing element exerting a force against a wheel of the wheelchair when the parking brake is engaged;
   a frame cover detachably connected to the retainer and positioned to cover a portion of the retainer and a portion of the lever; and
   a flexible force applying element formed from the detachable cover and placed under a preload, the force applying element positioned with respect to the hand brake lever to flex and apply a force to the hand brake lever when the hand brake lever is moved into the engaged position, the force acting to return the brake to the disengaged position.

2. The parking brake of claim 1, wherein the frame cover and flexible force applying element is formed from a plastic material.

3. The parking brake of claim 1, wherein the force applying element is formed from a portion of a flange of the frame cover which has been separated from the remainder of the flange.

4. The parking brake of claim 1, wherein the lever comprises a hand brake lever, and further comprising a pivoting lever pivotally connected to the retainer, the pivoting lever attached to the pressing element and coupled to the hand brake lever by a coupling that is pivotally connected to both the hand brake lever and the pivoting lever.

5. The parking brake of claim 4, wherein pivotal axes for the hand brake lever and the pivoting lever are provided by lever fasteners that attach these two levers to the retainer.

6. The parking brake of claim 5, wherein the frame cover is detachably connected to the retainer by the lever fasteners and positioned to cover portions of the retainer, the hand brake lever, the pivoting lever and the coupling.

7. The parking brake of claim 1, further comprising an attachment clip configured to attach the retainer to the frame member of the wheelchair.

8. The parking brake of claim 7, wherein the clip is generally U-shaped and comprises a split opening configured to receive the frame member, and a pair of legs that correspond to a guide on the retainer, and wherein the clip includes a fastener for attachment to the frame member and retainer by clamping the split opening about the frame member and the pair of legs about the retainer.

9. The parking brake of claim 8, wherein the attachment clip is continuously adjustable along both the frame member and the retainer guide within a range so as to adapt the parking brake to different types of wheelchairs.

10. A parking brake for a wheelchair comprising:
    a retainer attachable to a frame member of the wheelchair;
    a hand brake lever pivotally attached to the retainer, the hand brake lever moving the parking brake between a disengaged and an engaged position when the hand brake lever is pivoted;
    a pivoting lever pivotally attached to the retainer and coupled to the hand brake lever;
    a pressing element attached to the pivoting lever, the pressing element exerting a force against a wheel of the wheelchair when the parking brake is engaged;
    a detachable cover attached to the retainer and positioned to cover a portion of the retainer, the hand brake lever and the pivoting lever; and
    a flexible force applying element formed from the detachable cover and placed under a preload, the force applying element positioned with respect to the hand brake lever, the force applying element flexing and applying a force to the hand brake lever when the hand brake lever is moved into the engaged position, the force acting on the hand brake lever to return the brake to the disengaged position.

11. The parking brake of claim 10, wherein the frame cover comprises a plastic material and wherein the force applying element is a flange formed from the plastic material.

12. The parking brake of claim 10, further comprising a pair of fasteners that attach the hand brake lever, the pivoting lever and the frame cover to the retainer, the fasteners serving as the axes of rotation for the levers.

13. The parking brake of claim 10, further comprising an attachment clip configured to attach the retainer to the frame member of the wheelchair.

14. The parking brake of claim 13, wherein the clip is adjustably attachable to the retainer so that the parking brake may be adapted for different types of wheelchairs.

15. The parking brake of claim 13, wherein the clip is generally U-shaped and comprises a split opening configured to receive the frame member, and a pair of legs that correspond to a guide on the retainer, and wherein the clip includes a fastener for attachment to the frame member and retainer by clamping the split opening about the frame member and the pair of legs about the retainer.

16. The parking brake of claim 13, wherein the attachment clip is continuously adjustable along both the frame member and the retainer guide so as to adapt the parking brake to different types of wheelchairs.

* * * * *